INVENTORS
PETER K. HSIEH AND
DONALD H. MONTGOMERY
BY Carl V. Olson
ATTORNEY

INVENTORS
PETER K. HSIEH AND
DONALD H. MONTGOMERY
BY Carl V. Olson
ATTORNEY

United States Patent Office 3,500,359
Patented Mar. 10, 1970

3,500,359

MEMORY LINE SELECTION MATRIX FOR APPLICATION OF READ AND WRITE PULSES

Peter K. Hsieh, Cherry Hill, and Donald H. Montgomery, Woodbury, N.J., assignors to RCA Corporation, a corporation of Delaware Filed Mar. 6, 1967, Ser. No. 620,750
Int. Cl. G11b *5/00*
U.S. Cl. 340—174 8 Claims

ABSTRACT OF THE DISCLOSURE

A memory line selection matrix of the type wherein both ends of many memory conductor lines are coupled to selectively-operated transistor drivers and switches. When it is desired to select one memory line for the application of a read pulse of one polarity followed by a write pulse of the opposite polarity, it is necessary according to the prior art to employ twice as many unipolar transistor drivers and switches as are needed for the application of a pulse of one polarity only. In a memory of the 2½D type where corresponding conductors in many bit arrays are selected for the application of read pulses followed by write pulses, the disclosed selection matrix accomplishes the selection with from 25 to 33 percent fewer drivers and/or switches. The selection matrix employs two driver and switch means for simultaneously applying read pulses through corresponding selected conductors in two respective adjacent bit arrays, and then uses the same two driver and switch means to apply opposite-polarity write pulses through the same conductors in transposed respective ones of the two bit arrays.

BACKGROUND OF INVENTION

Random-access memories are commonly constructed of arrays of magnetic memory elements, such as cores, arranged to store many words each including many bits. Any one word storage location can be accessed at a time for the reading or writing of all the bits of a word of information. Known memory organizations include a two-dimensional or word-organized memory in which any one of many word lines is selected to access all of the bit locations along the selected line. A three-dimensional or coincident-current memory is one in which a half-select current is supplied to corresponding row conductors of all memory planes of a stack, and a half-select current is supplied to corresponding column conductors of all memory planes of the stack. One memory element in each plane at the crossover of the energized row and column conductors is thus fully selected for reading, and then, later, for writing.

A so-called two-and-a-half dimensional memory may be arranged to operate like a three-dimensional memory for reading and like a two-dimensional memory for writing. A 2½D memory includes a plurality of bit arrays, there being as many bit arrays as there are bits in the words stored in the memory, and there being as many memory elements in each bit array as there are word storage locations in the memory. Corresponding word column conductors of all bit arrays are connected in series. Word driver and switch means is provided for applying a word read pulse of one polarity followed by a word write pulse of the opposite polarity through any selected one of the series-connected column conductors.

While a single selection means is provided for selecting one word column conductor going through all of the bit arrays, as many separate respective bit row selection means are provided as there are bit arrays. That is, each bit array is provided with its own driver and switch means for selecting one of the bit row conductors in the bit array. Since it is necessary to supply a bit read pulse of one polarity conditionally followed by a bit write pulse of the opposite polarity to the selected row conductor in the bit array, it is necessary, according to the prior art, to provide each bit array with one driver and switch means for reading, and an additional driver and switch means for writing. Such an arrangement of bit drivers and switches for a single 16×16 bit array is shown in FIGURE 4 of an article by Howard P. Zinschlag entitled "A 2½D Integrated Circuit Memory" appearing on pages 26 through 39 of the September 1966 issue of Computer Design. It has been found that the described prior art bit driver and switch means can be improved, in accordance with this present invention, to achieve about a 25 percent reduction in the amount of circuitry needed.

BRIEF SUMMARY OF INVENTION

In accordance with an example of the invention, a memory includes a plurality of bit arrays each including a plurality of word column conductors and a plurality of bit row conductors. Corresponding word column conductors of all bit arrays are connected in series. A word read pulse of one polarity followed by a word write pulse of the opposite polarity are applied to any selected one of the series-connected column word conductors extending through all of the bit arrays. Means are provided to apply bit read pulses followed by bit write pulses to selected corresponding ones of the bit row conductors in all of the bit arrays. This means comprises a first and a second unidirectional bit driver and switch means for each pair of bit arrays. The first and second bit driver and switch means are connected to supply bit read pulses to two corresponding selected conductors in respective ones of the two bit arrays of the pair. The same first and second bit driver and switch means are additionally connected and utilized to conditionally supply bit write pulses to the two corresponding selected conductors in transposed respective ones of the bit arrays of the pair. The transposed double utilization of the read bit driver and switch means also for writing obviates the need for an additional write bit driver and switch means for each pair of bit arrays.

DETAILED DESCRIPTION

Figure 1:
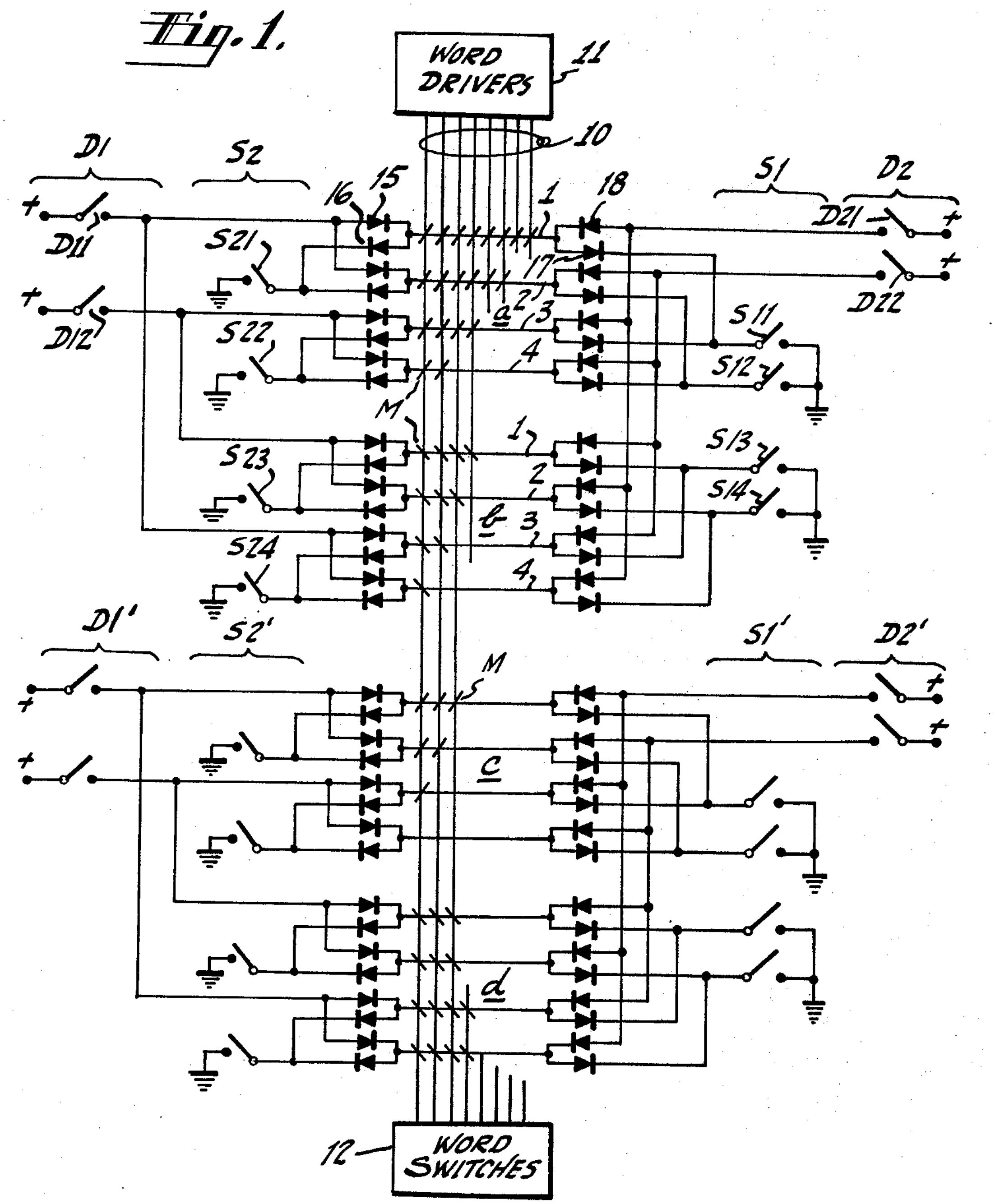
FIG. 1 is a simplified diagram of a 2½D memory constructed according to the teachings of the invention and illustrating a memory for storing 32 words of 4 bits each.

Reference is now made in greater detail to FIG. 1 showing a random-access memory including, by way of example, four bit arrays designated *a, b, c* and *d*. Each of the bit arrays includes memory elements or magnetic cores M arranged with four memory elements in each column and eight memory elements in each row. The illustrated memory is capable of storing thirty-two (four times eight) words each having four bits. Each of the bit arrays *a, b, c* and *d* is provided with a sense winding (not shown) linking all the memory elements in the respective bit array. The sense winding of each bit array *a, b, c* and *d* is coupled to a respective sense amplifier (not shown). The sense windings and sense amplifiers may be constructed as described in the aforementioned article by Howard P. Zinschlag.

The eight columns of magnetic elements in each of the bit arrays *a, b, c* and *d* are linked by eight respective word column conductors 10. The respective word column conductors in all bit arrays *a, b, c* and *d* are connected in series between word drivers 11 and word switches 12. Word drivers 11 and word switches 12 are operated in a conventional, known manner to apply a word read pulse of one polarity followed by a word write pulse of the opposite polarity through any selected one of the series-connected column conductors extending through all of the bit arrays.

The four rows of memory elements M in each bit array are linked by four respective bit row conductors 1, 2, 3 and 4. One end of each bit row conductor is connected to two oppositely-poled unidirectional conducting devices or diodes 15 and 16, and the other end of each bit row conductor is connected to two oppositely-poled unidirectional conducting devices or diodes 17 and 18. The diodes 15 and 17 permit a current flow in one direction, i.e., to the right, through a respective bit row conductor, and the diodes 18 and 16 permit a current flow to the left through the respective bit row conductor.

Current pulses are applied through the bit row conductors 1, 2, 3 and 4 of bit arrays *a* and *b* in the direction from left to right under the control of a first bit driver means D1 and a first switch means S1. Current pulses are applied through the bit row conductor of bit arrays *a* and *b* in the direction from right to left under the control of a second driver means D2 and a second switch means S2.

A similar arrangement is employed for bit arrays *c* and *d* which are served by a first driver and switch means D1′, S1′ and a second driver and switch means D2′, S2′. The bit arrays *a* and *b* constitute a pair of bit arrays, and bit arrays *c* and *d* constitute another pair of bit arrays. A practical 2½D memory will normally include more than four bit arrays, and be similarly divided into pairs of bit arrays. It should be noted that the memory elements M in bit array *a* are oriented along one diagonal, and the memory elements M of the other bit array *b* are oriented along the other diagonal. Similarly, the memory elements M in bit arrays *c* and *d* are oriented along different diagonals. The result of this alternated diagonal orientation of the magnetic cores M in the two bit arrays of a pair is that the read pulse direction through one bit array of a pair is from left to right, and in the other bit array of the pair is from right to left.

The first digit driver D1 includes current switches D11 and D12 together with a source of positive potential +. The current switches D11 and D12 may be the usual transistor current switches which are operated selectively in accordance with memory address control signals applied thereto. The first driver D1 may be constructed in any well known manner such as in the manner described in the aforementioned article. The term "driver" is employed herein to describe any suitable arrangement of pulse generators and/or current switches.

The first switch means S1 includes two read voltage switches S11, S12 and two write voltage switches S13, S14. The voltage switches are similarly entirely conventional and may be as described in the aforementioned article. A second bit driver and switch means D2, S2 is constructed the same as the first bit driver and switch means D1, S1. The arrangement is repeated for bit arrays *c* and *d* which are served by a first driver and switch means D1′, S1′ and a second driver and switch means D2′, S2′. All of the drivers (current switches) and voltage switches are operated selectively in accordance with a multi-bit address supplied to the memory in the manner customarily employed with 2½D memories.

In the operation of a conventional 2½D memory, a selected one of the column word conductors 10 is energized with a half-select word read pulse in one direction. At the same time, one corresponding bit row conductor in each bit array is energized by a bit read half-select pulse. This results in the full selection of one memory element in each bit array, and the switching of selected memory elements storing "1's" is sensed on respective sense windings and amplified by respective sense amplifiers. At a following time a half-select word write pulse is applied in the opposite direction through the previously-selected column conductor 10 and a half-select bit write pulse is conditionally applied in the write direction through each previously-selected bit row conductor in each bit array. The application of bit write half-select pulses is conditioned on the information to be written. That is, a half-select bit write pulse is applied through a bit row conductor of a bit array if it is desired to write a "1," but no half-select bit write pulse is applied through the selected bit row conductor if a "0" is to be stored.

The above-described operation of prior-art 2½D memories applies also to the 2½D memory of the invention illustrated in FIG. 1. The memory of FIG. 1 differs from prior-art memories in requiring the inclusion of 25 percent to 33 percent fewer current switches and/or voltage switches.

In the operation of the memory of FIG. 1, bit read pulses are simultaneously applied through one corresponding selected bit row conductor in each of the bit arrays *a, b, c* and *d*. The read pulse is applied from left to right through one of the bit row conductors in bit array *a* by closing one of the current switches D11, D12 and closing one of the voltage switches S11, S12. Simultaneously, a read pulse is applied in the direction from right to left through a corresponding selected one of the bit row conductors in the bit array *b* by closing one of the current switches D21, D22 and closing one of the voltage switches S23, S24.

To summarize, the first driver and switch means D1, S1 is used to supply a read pulse through a selected bit row conductor in bit array *a*, and the second bit driver and switch means D2, S2 is simultaneously employed to apply a read pulse through a selected one of the bit row conductors in bit array *b*.

The same drivers D1, D2 used for supplying read pulses to bit arrays *a* and *b* are then at a slightly later time employed to supply write pulses of opposite polarities to the same selected bit row conductors in transposed ones of the bit array *a, b*. That is, during the write interval, a write pulse is applied through the selected bit row conductor in bit array *a* by closing one of the current switches D21, D22 and closing one of the voltage switches S21, S22, and simultaneously a write current pulse is applied through the selected bit row conductor in bit array *b* by closing one of the current switches D11, D12 and closing one of the voltage switches S13, S14. The two drivers D1 and D2 as connected are sufficient to supply both of the bit arrays *a* and *b* with respective bit read pulses followed by opposite-polarity bit write pulses.

The connections of the drivers and switches are made in such a way as to avoid undesired sneak paths for the currents. The following Table I lists eight selection possibilities, which include the application of read pulses or write pulses through any one of the four row conductors in each of the two arrays *a* and *b*. The table gives the drivers and switches that must be operated for each of the eight selection conditions.

TABLE I

| Selection | Driver-Switch for array *a* | Driver-Switch for array *b* |
|---|---|---|
| Read rows 1 | D11–S11 | D22–S23 |
| Write rows 1 | D21–S21 | D12–S13 |
| Read rows 2 | D11–S12 | D21–S23 |
| Write rows 2 | D22–S21 | D12–S14 |
| Read rows 3 | D12–S11 | D22–S24 |
| Write rows 3 | D21–S22 | D11–S13 |
| Read rows 4 | D12–S12 | D21–S24 |
| Write rows 4 | D22–S22 | D11–S14 |

Figure 2:
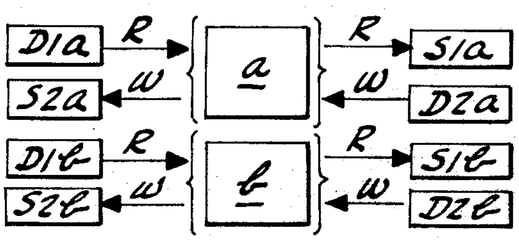
Fig. 2. Prior Art
FIG. 2 is a diagram which will be referred to in describing the organization of a 2½D memory constructed according to the prior art.
Figure 3:
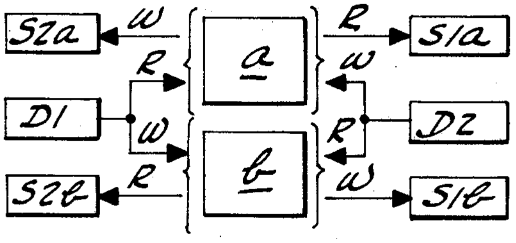
FIG. 3 is a diagram for comparing a memory organization of the invention according to FIG. 1 with the prior art memory organization of FIG. 2.

Reference is now made to FIGS. 2 and 3 for a comparison of the conventional prior-art arrangement and the arrangement according to the invention. In FIG. 2, two bit arrays of a conventional 2½D memory are represented at *a* and *b*. Drivers D1*a* and switches S1*a* permit a read pulse to be applied through any selected row conductor in bit array *a*. Drivers D2*a* and switches S2*a* permit an opposite polarity write pulse to be applied through the same selected row conductor in the bit array *a*. The bit array *b* is similarly provided with drivers and switches. The prior art arrangement of FIG. 2 is seen to include two sets of drivers and two sets of switches for each bit array, or a total of four sets of drivers and four sets of switches for a pair *a*, *b* of bit arrays.

FIG. 3 is a comparable diagram illustrating the drivers and switches used for a pair of bit arrays in the arrangement shown in greater detail in FIG. 1. In FIG. 3, the drivers D1 and switches S1*a* (S11 and S12 in FIG. 1) apply a read pulse through a selected row conductor in bit array *a* at the same time that drivers D2 and switches S2*b* (S23 and S24 in FIG. 1) apply a read pulse through a corresponding selected row conductor in bit array *b*. During the write interval, the driver D2 and switch S2*a* (S21 and S22 in FIG. 1) apply a write pulse through the same selected row conductor in bit array *a* at the same time that the drivers D1 and switches S1*b* (S13 and S14 in FIG. 1) supply a write pulse through the same corresponding selected row conductor in bit array *b*. When the arrangement according to the invention as shown in FIG. 3 is compared with the arrangement of the prior art as in FIG. 2, it is seen that the arrangement of FIG. 3 requires only two sets of drivers as compared with the four sets of drivers required in the arrangement of FIG. 2. The arrangement of FIG. 3 permits a 50 percent saving in the number of drivers, or a 25 percent saving in the number of drivers and switches combined.

Figure 4:
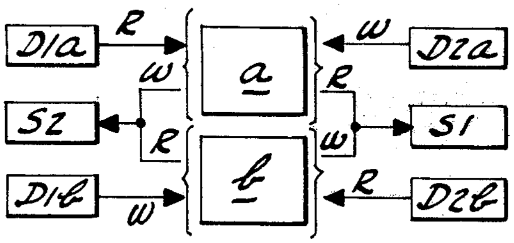
FIG. 4 is a diagram illustrating an alternative embodiment of the invention.

FIG. 4 shows an alternative arrangement according to the invention wherein only two sets of switches S1, S2 are employed together with four sets of drivers. FIG. 4 illustrates that the economy afforded according to the invention can be realized as a saving in the required number of switches, instead of a saving in the required number of drivers.

Figure 5:
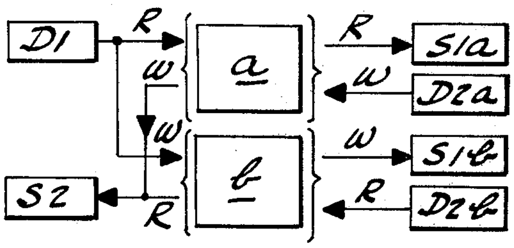
FIG. 5 is a diagram illustrating another alternative embodiment of the invention.

FIG. 5 shows another embodiment according to the invention wherein the saving is taken in the form of one set of drivers and one set of switches. The equivalent economy afforded by the three embodiments shown in FIGS. 3, 4 and 5 results from the fact that a single bit row conductor in a bit array is selected by closing appropriate switches at both ends of the bit row conductor. Therefore the saving can be taken at one end, the other end, or both ends, of the conductor.

In all of the embodiments shown in FIGS. 3, 4 and 5 there is included a first driver and switch means having parts with designations including D1 and S1. Each embodiment also includes a second driver and switch means having parts with designations including D2 and S2. In all cases, the directions of read pulses and write pulses are indicated by the letters R and W, respectively.

While the invention has been described as applied to a 2½D memory having pairs of bit arrays, it is also applicable to other types of memories having at least two arrays of memory elements, and requiring opposite-polarity pulses in sequence through one conductor in each of the two arrays.

What is claimed is:

1. A memory including first and second arrays of memory elements, each array including a plurality of column conductors and a plurality of row conductors, and means to apply a pulse in a read direction followed by a pulse in an opposite write direction through a selected corresponding one of the row conductors in each of said first and second arrays, said means comprising a first unidirectional driver and switch means connected to supply a read pulse at a given time to a selected one of the row conductors in said first array, a second unidirectional driver and switch means connected simultaneously to supply a read pulse to a corresponding selected one of the row conductors in said second array, said second unidirectional driver and switch means being operative at a later time to supply a write pulse to said selected one of the row conductors in said first array, and said first unidirectional driver and switch means being operative simultaneously to supply a write pulse to said corresponding selected one of the row conductors in said second array.

2. A memory as defined in claim 1 wherein said first and second driver and switch means includes two sets of drivers and four sets of switches.

3. A memory as defined in claim 1 wherein said first and second driver and switch means includes four sets of drivers and two sets of switches.

4. A memory as defined in claim 1 wherein said first and second driver and switch means includes three sets of drivers and three sets of switches.

5. A memory as defined in claim 1 wherein said memory elements in the two arrays are oppositely oriented.

6. A memory including a plurality of bit arrays of memory elements, each bit array including a plurality of word column conductors and a plurality of bit row conductors, corresponding word column conductors of all bit arrays being connected in series, means to apply a word read pulse of one polarity followed by a word write pulse of the opposite polarity through any selected one of the series-connected column conductors extending through all of said bit arrays, means to apply bit read pulses followed by bit write pulses to selected corresponding ones of the bit row conductors in all of said bit arrays, said means comprising a first and a second unidirectional bit driver and switch means for each pair of said bit arrays, said first and second bit driver and switch means being connected to supply bit read pulses to respective ones of the bit arrays of the pair, wherein the improvement comprises the additional connection and utilization of said first and second bit driver and switch means to conditionally supply bit write pulse to transposed respective ones of the bit arrays of the pair, whereby to obviate the need for additional bit driver and/or switch means for each pair of bit arrays.

7. A memory as defined in claim 6 wherein said memory elements in the two bit arrays of each pair are oppositely oriented.

8. A memory including a plurality of bit arrays each including a plurality of word column conductors and a plurality of bit row conductors, corresponding word column conductors of all bit arrays being connected in series, means to apply a word read pulse of one polarity followed by a word write pulse of the opposite polarity through any selected one of the series-connected column conductors extending through all of said bit arrrays, wherein the improvement comprises first bit driver and switch means to apply bit read pulses through corresponding ones of the bit row conductors in all alternate ones of said bit arrays, and conditionally to apply bit write pulses through corresponding ones of the bit row conductors in all intermediate ones of said bit arrays, and second bit driver and switch means conditionally to apply bit write pulses through corresponding ones of the bit row conductors in all alternate ones of said bit arrays, and to apply bit read pulses through corresponding ones of the bit row conductors in all intermediate ones of said bit arrays.

References Cited

UNITED STATES PATENTS

| | | | |
|---|---|---|---|
| 3,135,948 | 6/1964 | Ashley | 340—174 |
| 3,192,510 | 6/1965 | Flaherty | 340—174 |

BERNARD KONICK, Primary Examiner

K. E. KROSIN, Assistant Examiner